Oct. 14, 1941.    F. WILLIAMS    2,258,835
FLOW SWITCH
Filed June 12, 1940

Inventor
Fred Williams
By Blackmore, Spencer & Flint
Attorneys

Patented Oct. 14, 1941

2,258,835

UNITED STATES PATENT OFFICE 2,258,835

FLOW SWITCH

Fred Williams, Flint, Mich., assignor to General Motors Corporation, Detroit, Mich., a corporation of Delaware Application June 12, 1940, Serial No. 340,058

3 Claims. (Cl. 200—81)

This invention relates to a switch device actuated by flow of water or other fluid.

There are many instances in which it is desirable to have an apparatus operate in accordance with the flow of water or other fluid thereto. For example, in welding devices of various kinds it is essential as a practical matter that the welding device be operable only so long as water or other cooling fluid is continuously flowing thereto. A number of constructions of this kind have been previously designed but none of them of which I am aware has been entirely satisfactory under variable conditions of operation. The primary object of the present invention is to provide improvements in a flow switch for controlling a machine in accordance with the flow of water or other fluid thereto and which is especially adapted for welding machines and the like. Another important object of the present invention is to provide a flow switch controlled by pressure conditions on both the inlet and outlet side of the device. Other objects and advantages of my invention will become more apparent as the description proceeds.

In the drawing forming part of this specification:

Figure 1:
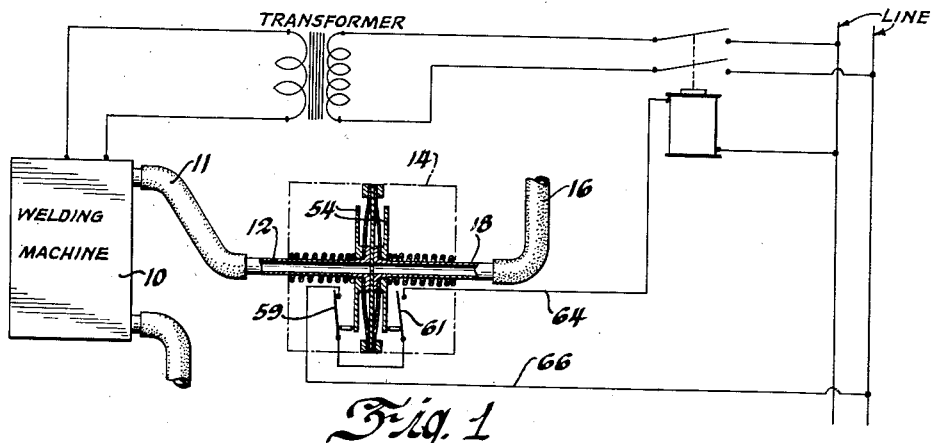
Figure 1 is a diagrammatic showing of the flow switch of the present invention in conjunction with a welding machine.

In the drawing is indicated diagrammatically a welding machine 10 having a water supply line 11 leading thereto from an outlet tube 12 of a flow switch device indicated generally by the reference numeral 14. A water supply line 16 is connected to an inlet tube 18 of the flow switch device.

The flow switch device comprises a hollow cylindrical body 30 having similar end plates 32 in screw threaded engagement with the opposite ends of the cylindrical body. In screw-threaded engagement with the two end plates are similar sleeves 34. Loosely mounted within the sleeves are the inlet and outlet tubes 12 and 18, respectively, tube 12 having a flanged end 36, while tube 18 has a flanged end 38. Between the flanged ends of the two tubes is a plate 40 having an orifice 42 in the center thereof. The opening is in alignment with the inlet and outlet tube passages and is of smaller area than the cross-sectional area of the passages.

On each side of the plate 40 is a flexible diaphragm 44. The outer peripheries of the two diaphragms are held in tight and liquid sealing engagement with the periphery of the plate by similar washers 46 and similar clamping rings 48, the latter being in screw-threaded engagement with a constricted portion 50 of the body 30. The inner edges of the two diaphragms are held in tight and liquid sealing engagement with the two flanges of the inlet and outlet tubes by means of similar washers 52 and similar contact plates 54 having screw-threaded engagement at 56 with each of the two tubes. Similar coil springs 58 are within the sleeves 34 and surround the inlet and outlet tubes and bias the similar plates 54 and flanged ends of the tubes toward each other, the orifice plate acting as a fixed stop to limit this movement. The free ends of the two sleeves 34 act as stops limiting the extent of travel of the similar contact plates 54 away from the orifice plate.

Fixed to the two end plates are a normally closed snap or micro switch 59 and a normally open snap or micro switch 61, switch 59 being on the outlet side of the device and switch 61 on the inlet side. Movement of the outlet tube and left hand contact plate 54 to the left as viewed in Figure 2 will cause this contact plate to contact and move the operating member 60 of normally closed switch 59 to open the same, while movement of the inlet tube and right hand contact plate 54 to the right will cause this plate to contact and move the operating member 62 of the normally open switch to close the same. The two switches are connected in series with any suitable control circuit which may be a welding control circuit 64, 66.

Figure 2:
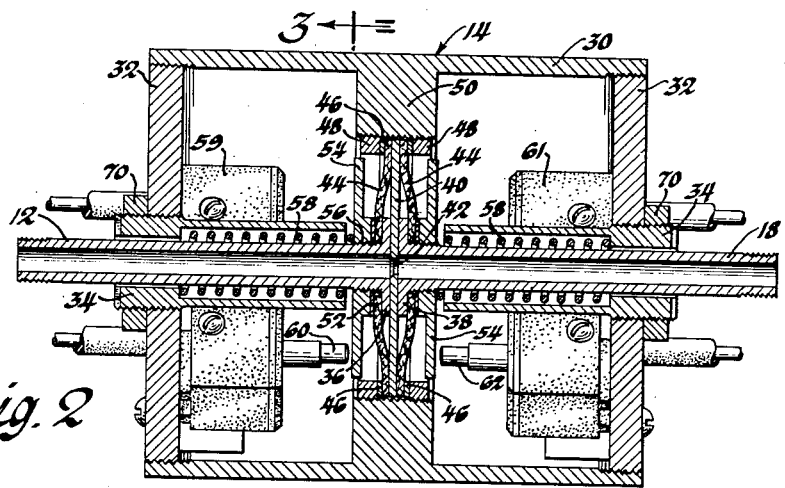
Figure 2 is a sectional view of the flow switch of the present invention.
Figures 3, 4, 5:
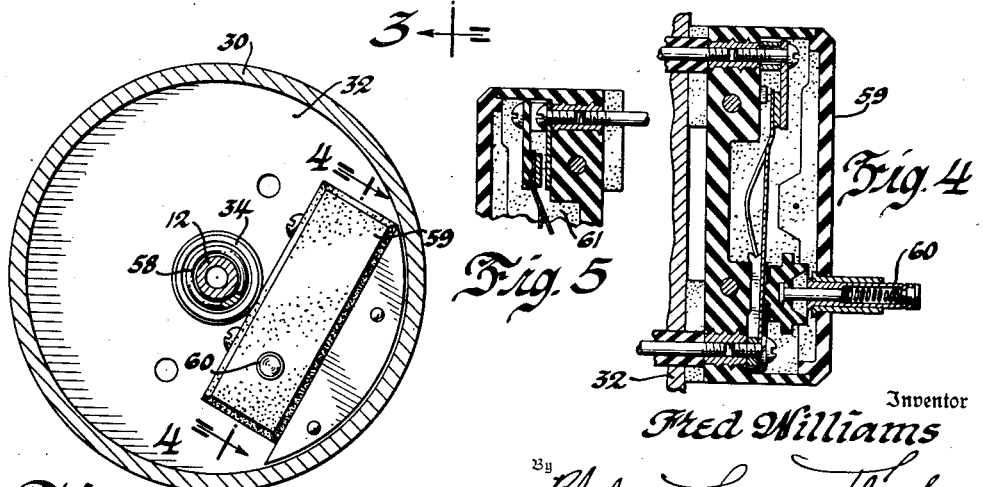
Figure 3 is a sectional view on line 3—3 in Figure 2.
Figure 4 is a sectional view on line 4—4 in Figure 3 and shows the construction of a normally closed switch on the outlet side of the device.
Figure 5 is a sectional view of a normally open switch on the inlet side of the device.

Figures 1 and 2 show the relative positions of the parts of the water flow switch under the normal or inoperative condition with no water flowing to the device. The incoming flow of water through the movable inlet tube 18 and orifice plate 40 creates a pressure between the orifice plate and right hand diaphragm causing the inlet tube 18 and contact plate to move to the right to move the operating element 62 of the normally open switch 61 causing it to become closed. As the left hand switch in series with the right hand one is normally closed the circuit to be controlled is completed and maintained by the flow of water. Stopping the incoming flow of water at the inlet side of the device causes the pressure to drop so that the right hand spring 58 will move the inlet tube and associated parts to the left to cause switch 61 to open and break the control circuit at this point. Stopping the incoming flow of water may occur intentionally, or accidentally upon failure of the source of water supply. In either case the right hand switch is opened and the control circuit broken. Should the outlet side of the fluid passage from the flow switch become plugged or stopped for any reason, either in the welding apparatus or elsewhere, the control circuit will also be broken. This condition will occur when the normally open switch 61 on the inlet side of the flow switch has been closed by the fluid pressure acting between the orifice plate and the right hand diaphragm as described above. If the discharge side of the line from the flow switch should then become plugged or stopped, pressure now also builds up between the orifice plate and the left hand diaphragm, moving the latter and outlet tube and left hand contact plate 54 to the left as viewed in Figures 1 and 2 until this contact plate engages and moves the operating member 60 of the normally closed switch to open the same, thus breaking the control circuit.

The similar sleeves 34 are adjustable lengthwise by means of the screw-threaded connections with the end plates, similar lock nuts 70 holding the parts in desired position. The adjustment of the sleeves 34 is so determined as to limit movement of the inlet and outlet tubes within the limits of over travel of the two switches and to prevent excessive strain on the two diaphragms. The end plates 32 are also adjustable with respect to the cylindrical body 30 by means of the screw threaded connections therewith.

I claim:

1. In a flow switch device; a hollow cylindrical body member; two adjustable end plates therefor; a first sleeve adjustably secured by one end thereof to one of the two end plates; a second sleeve adjustably secured by one end thereof to the other of the two end plates; a flanged inlet tube extending through the first sleeve; a flanged outlet tube extending through the second sleeve; a plate between the flanges of the inlet and outlet tubes having an orifice therein in alignment with the inlet and outlet tubes, said orifice being of smaller area than the cross-sectional area of passages in the inlet and outlet tubes; two flexible diaphragms, one on each side of the plate, both diaphragms having their outer peripheries in liquid sealing engagement with the outer edge of the plate and one diaphragm having an inner portion in liquid sealing relation with the flange of the inlet tube and the other diaphragm having an inner portion in liquid sealing relation with the flange of the outlet tube; a spring between the flanged inlet tube and one of the sleeves normally biasing the flange of said inlet tube toward said plate; a second spring between the flanged outlet tube and the other of said sleeves normally biasing the flange of said outlet tube toward said plate; a first and normally open switch carried by the end plate on the inlet side; a second and normally closed switch carried by the end plate on the outlet side and being in series with the first switch; means fixed to said inlet tube and moved with the tube by fluid pressure built up between the orifice plate and diaphragm on the inlet side when fluid flows therein to close the normally open switch; and means fixed to the outlet tube and movable by said tube for opening the normally closed switch should pressure build up between the orifice plate and diaphragm on the outlet side.

2. In a flow switch; a plate having an orifice; a movable inlet tube on one side of said plate having a passage of larger diameter than the orifice; a movable outlet tube on the opposite side of said orifice having a passage in alignment with the inlet passage and being of larger diameter than the orifice; a flexible diaphragm fixed to the outer portion of one side of the plate and to the inlet tube; a second flexible diaphragm fixed to the outer portion of the opposite side of the plate and to the outlet tube; a first and normally open switch; a second and normally closed switch in series with the first switch; means operated by fluid pressure build up between the orifice plate and the diaphragm on the inlet side of the plate when fluid flows in the inlet tube to close the normally open switch; and means for opening the normally closed switch should pressure between the orifice plate and the diaphragm on the outlet side of the orifice built up beyond a definite value.

3. In a flow switch; a plate having an orifice; an inlet tube having a passage of larger cross-sectional area than the orifice and communicating therewith; an outlet tube having a passage of larger cross-sectional area than the orifice and communicating therewith; and switch means operable to complete an electric circuit only when fluid pressure of a definite amount is built up between the orifice plate and inlet tube and only when fluid pressure between the orifice plate and outlet tube is less than a definite amount.

FRED WILLIAMS.